Figure 1:
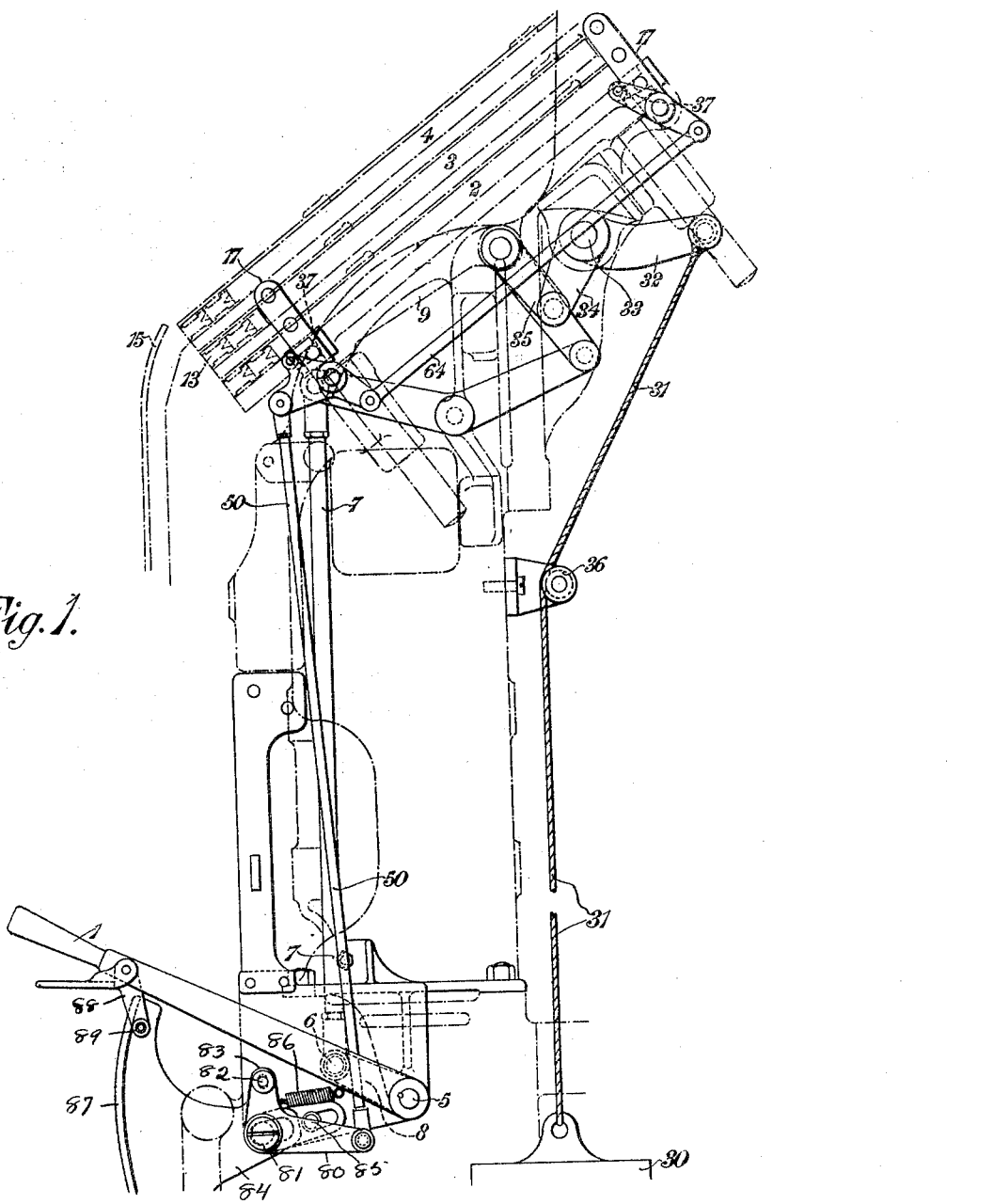

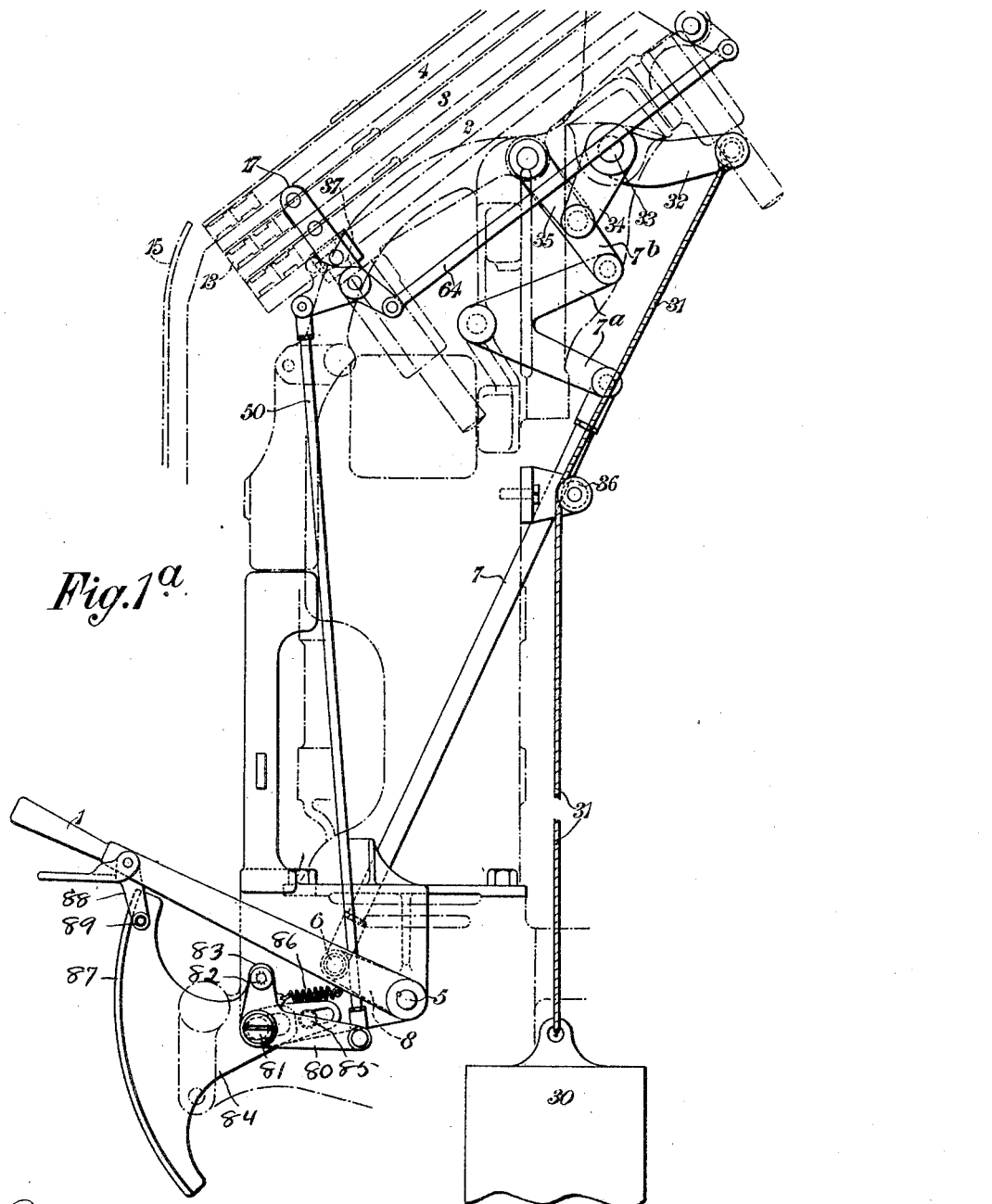

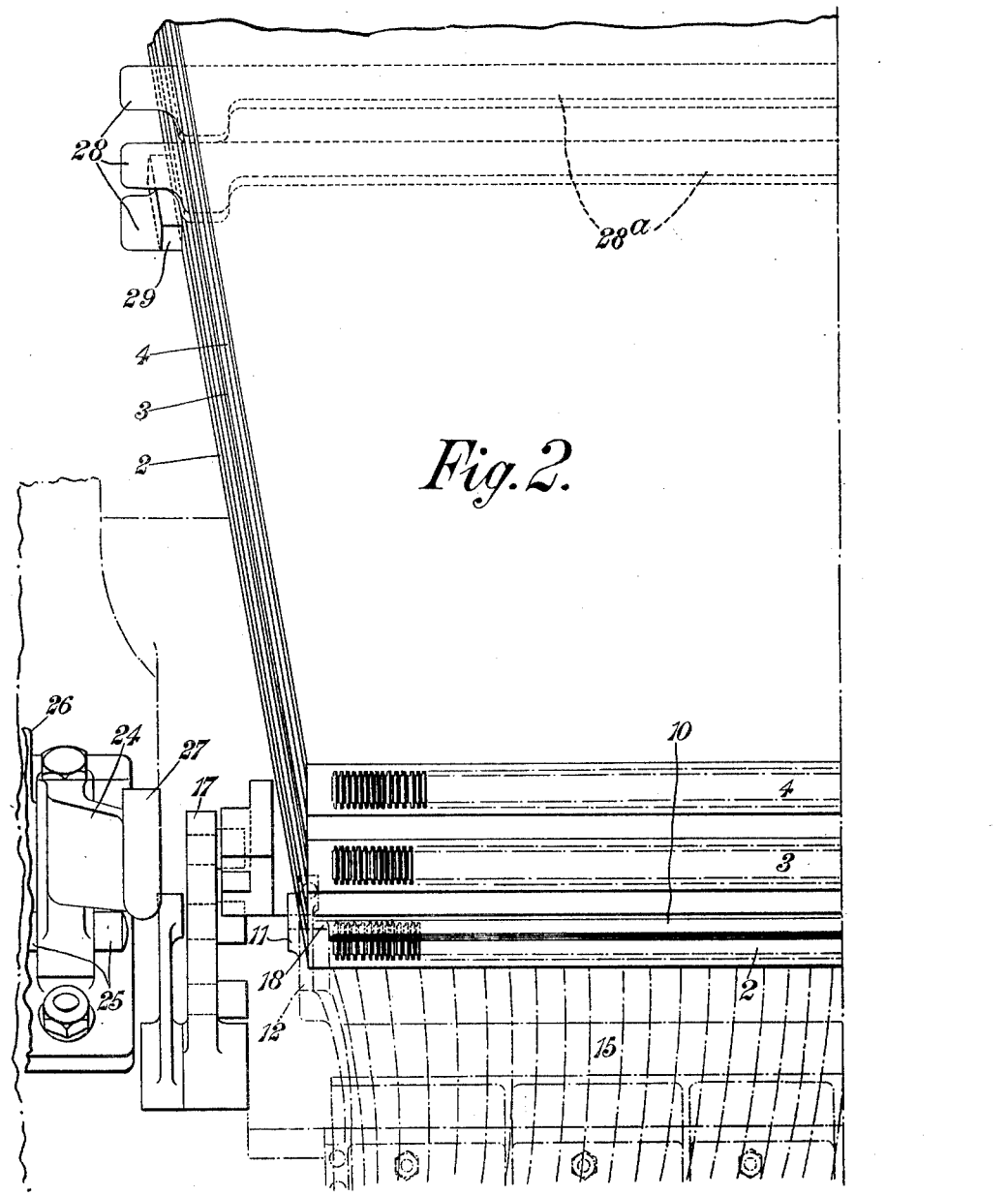

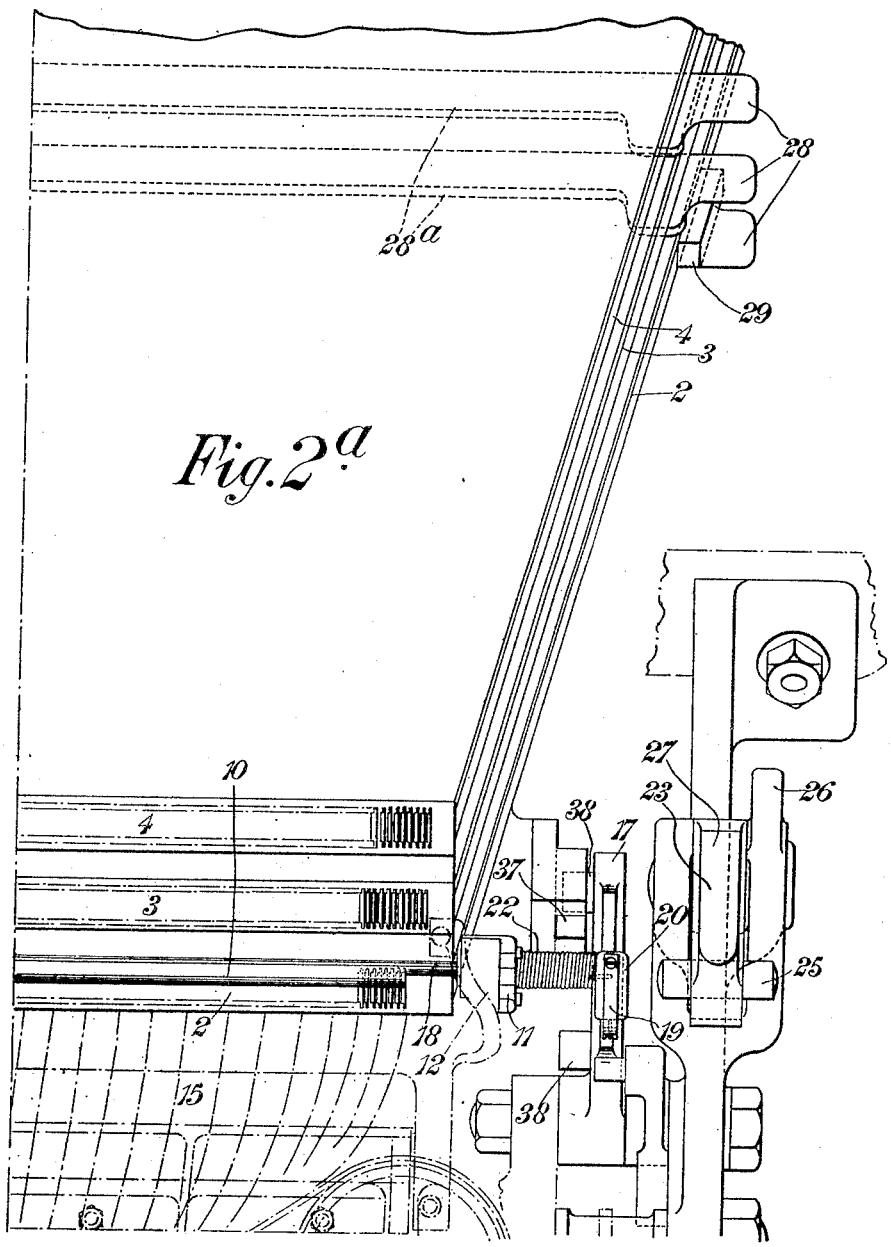

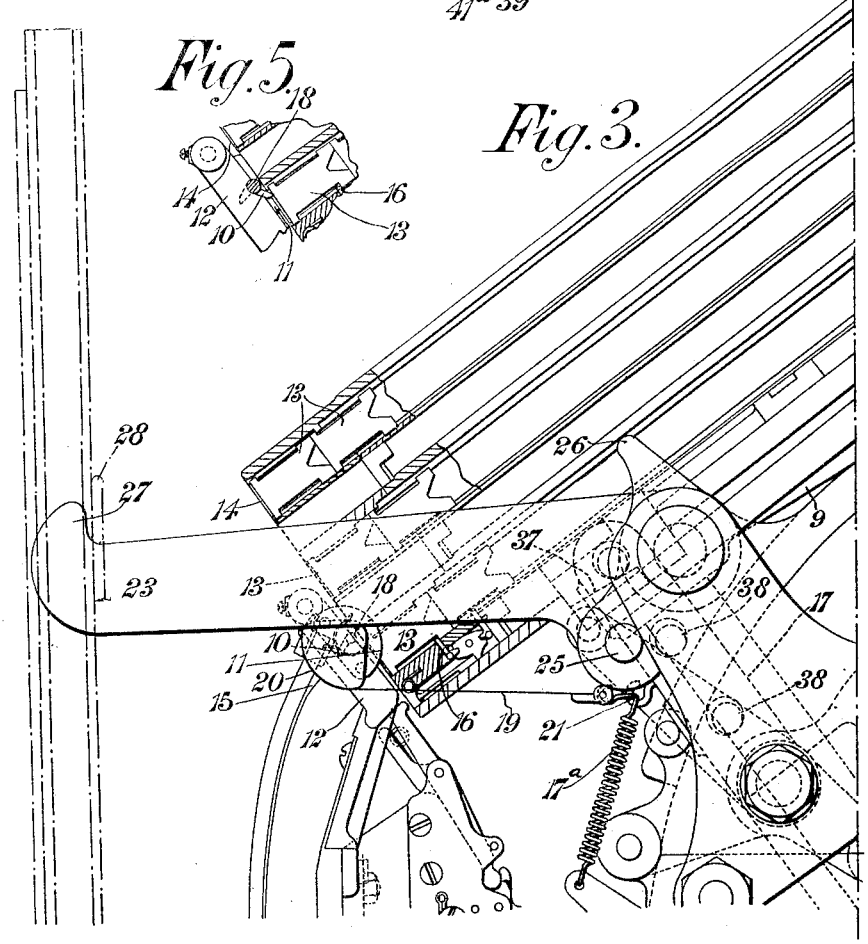

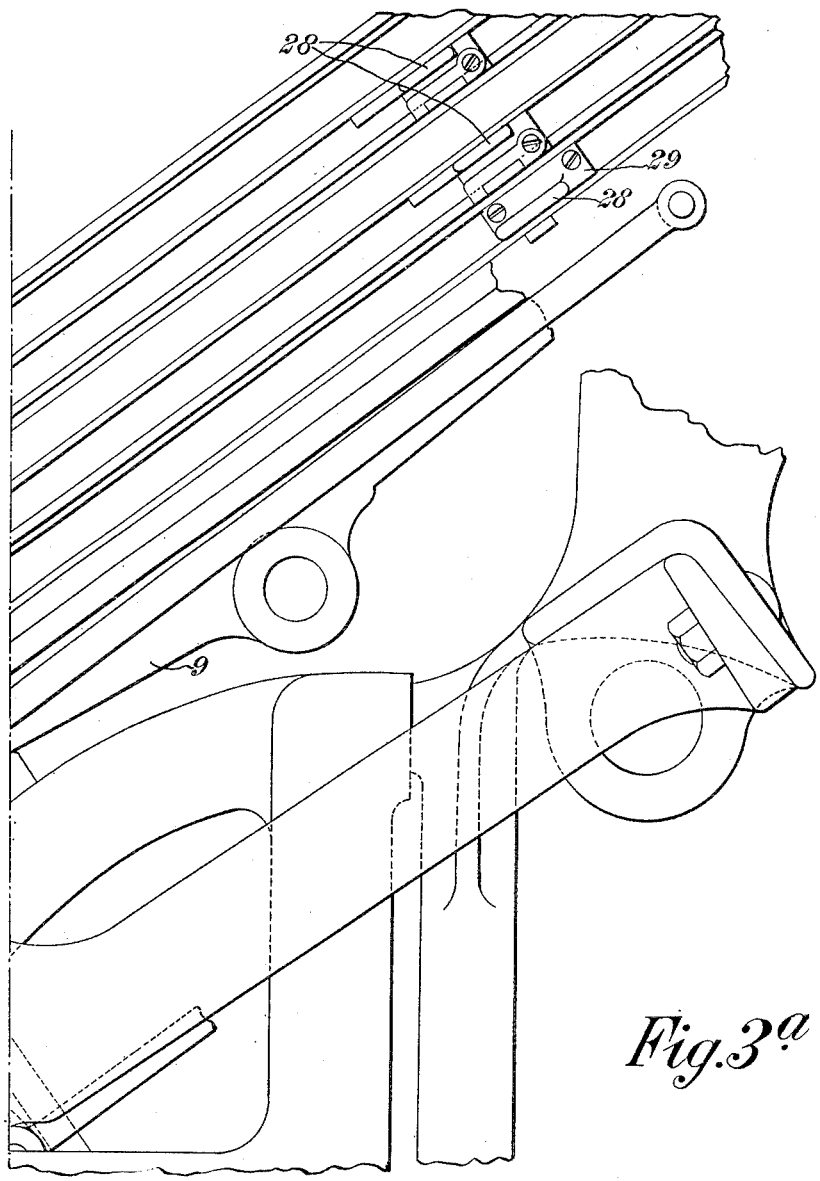
Fig.3ᵃ

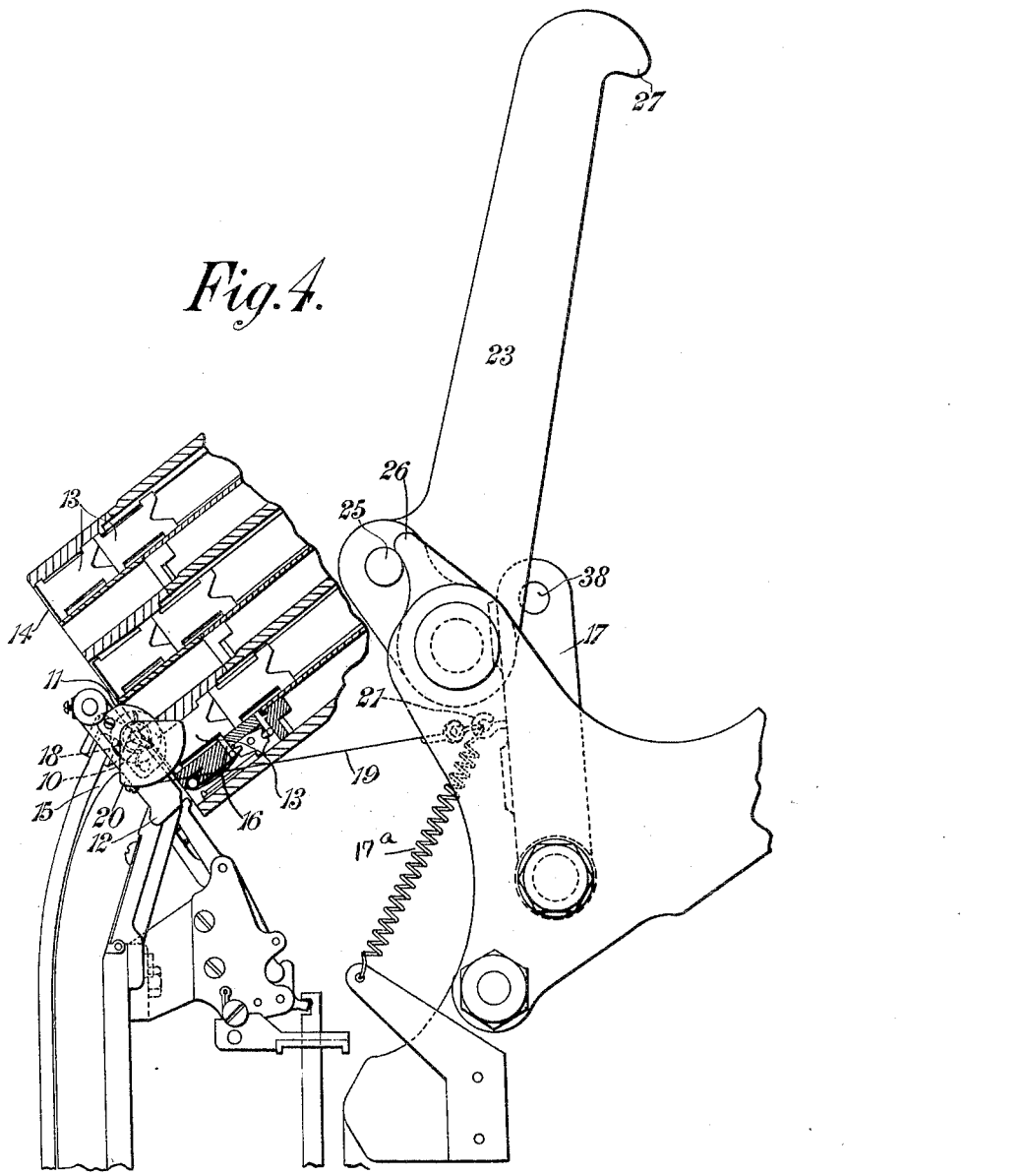

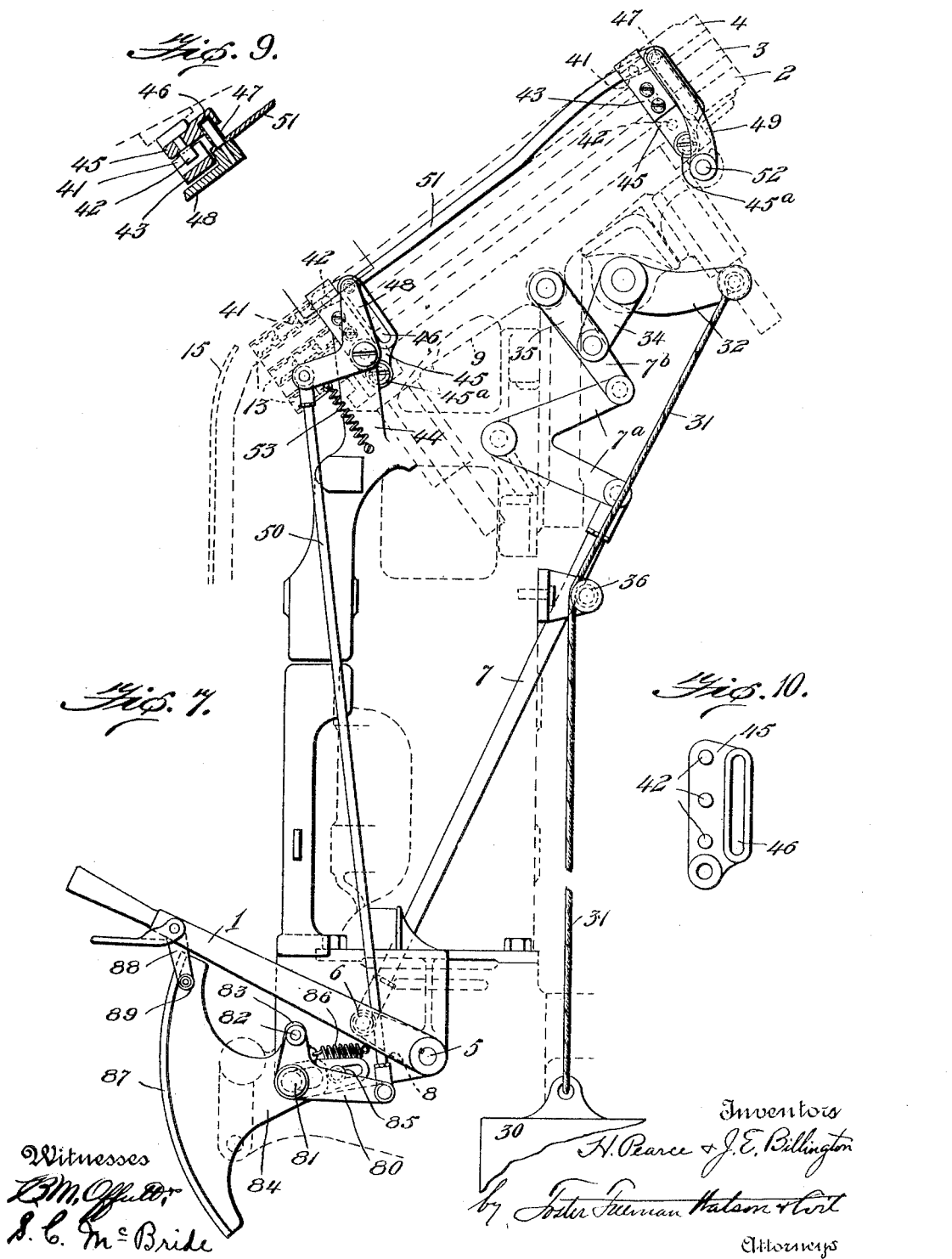

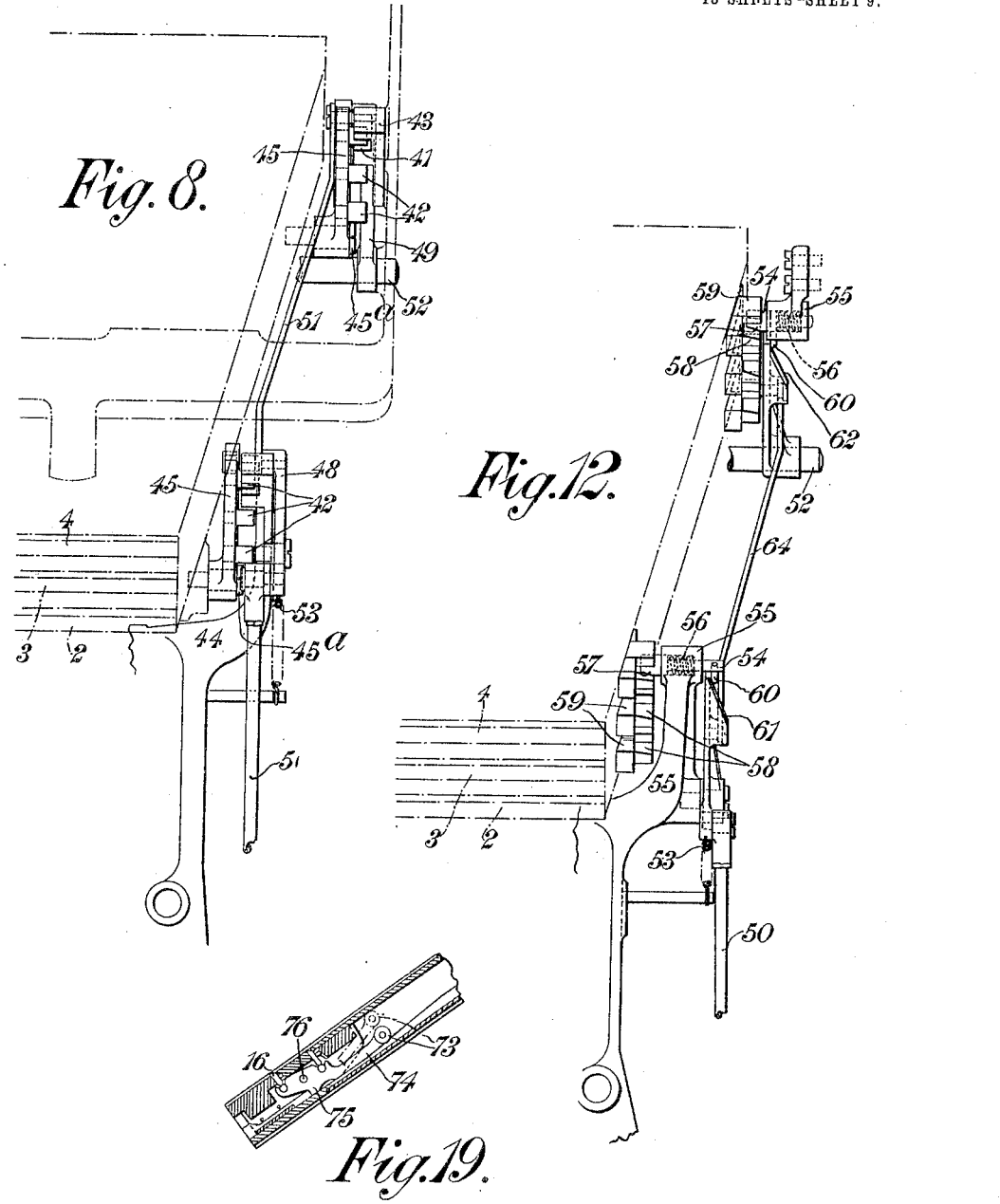

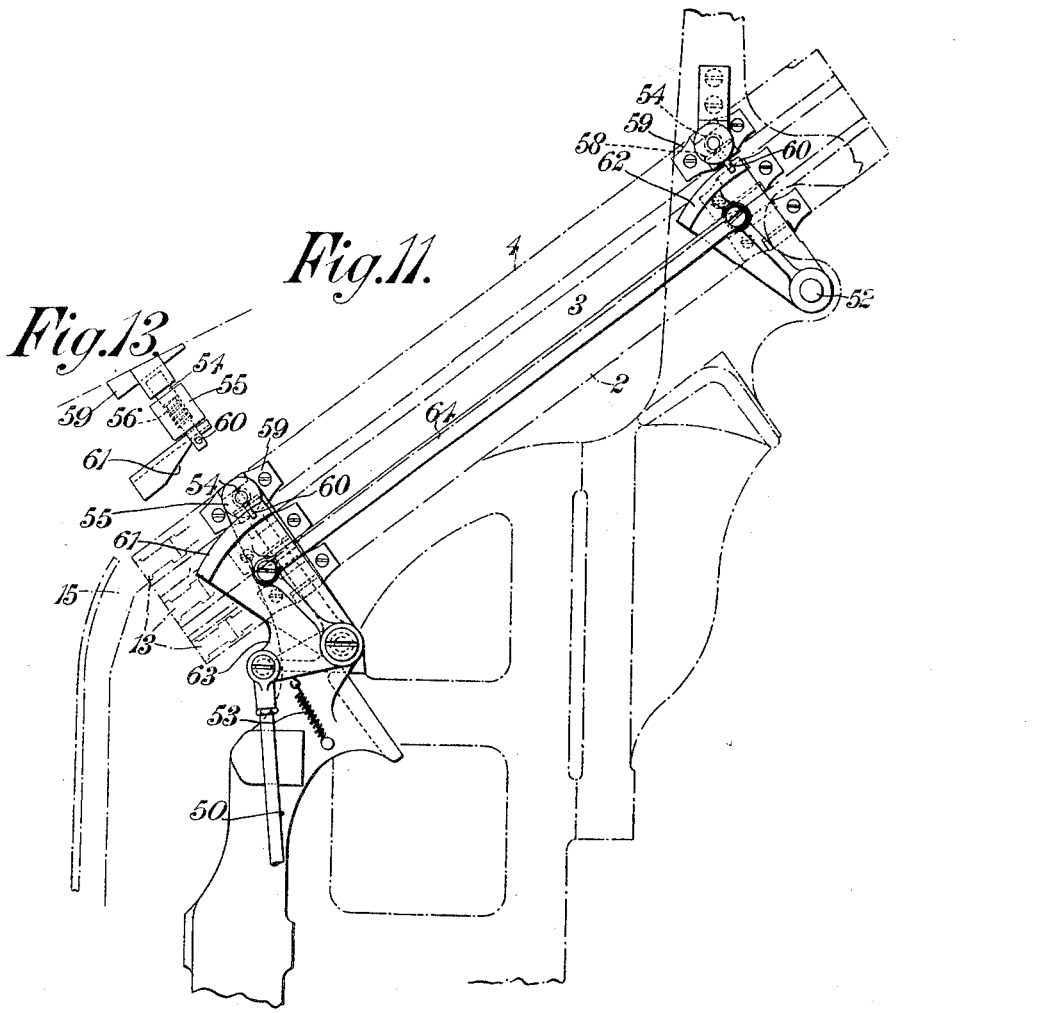

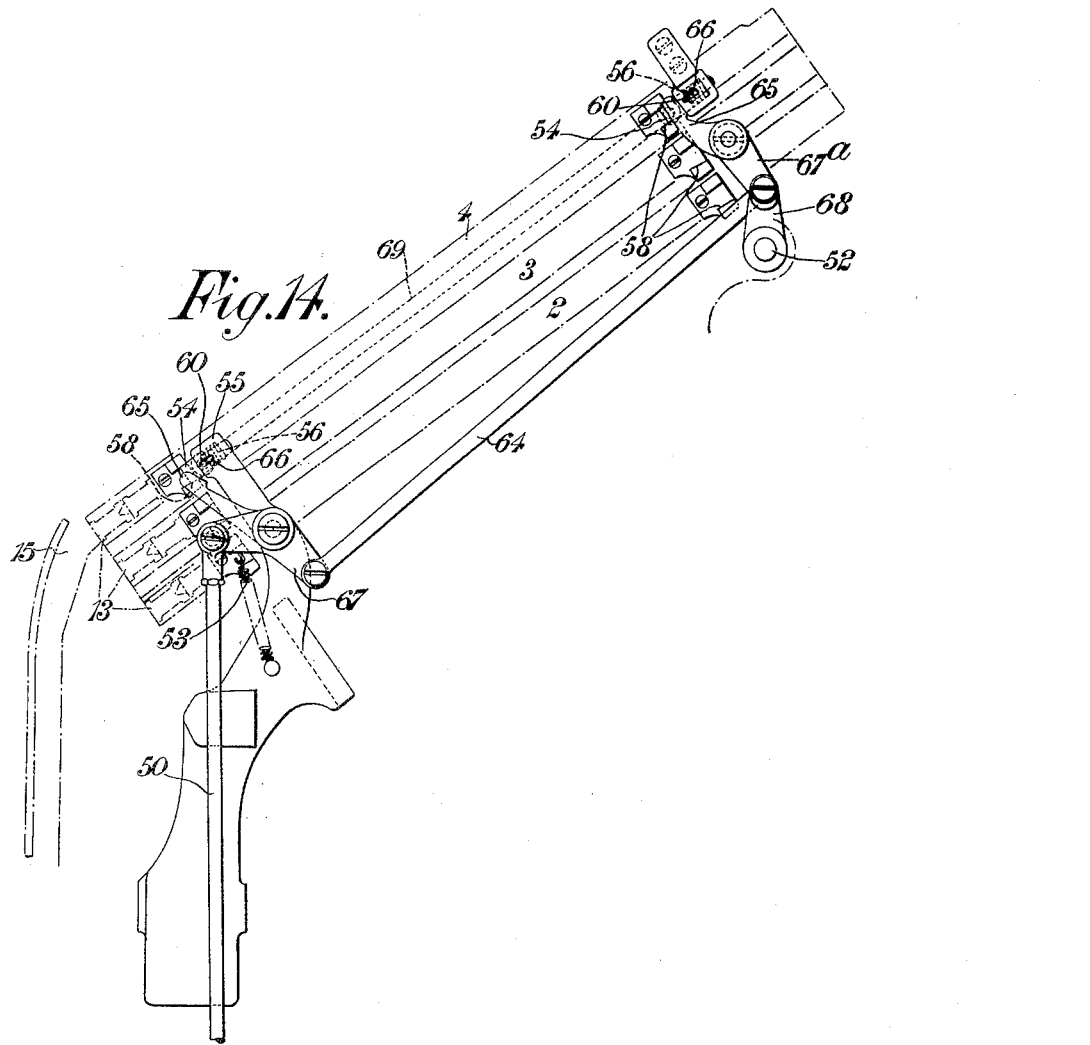

H. PEARCE & J. E. BILLINGTON.
TYPOGRAPHICAL COMPOSING MACHINE.
APPLICATION FILED SEPT. 17, 1909.
1,116,620.
Patented Nov. 10, 1914.
13 SHEETS—SHEET 12.
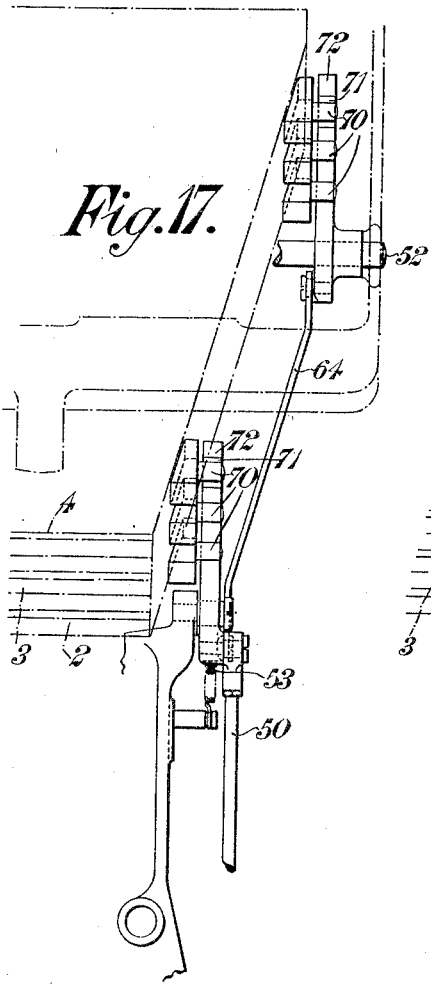
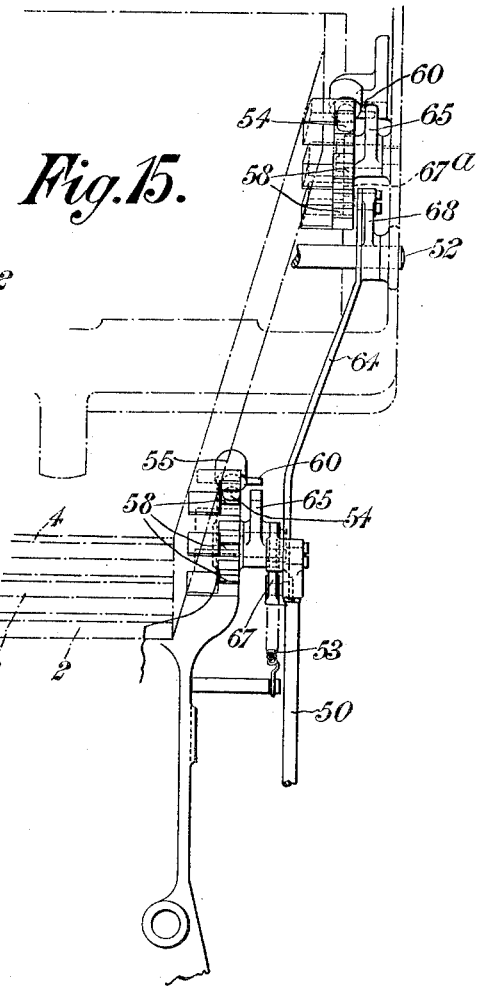

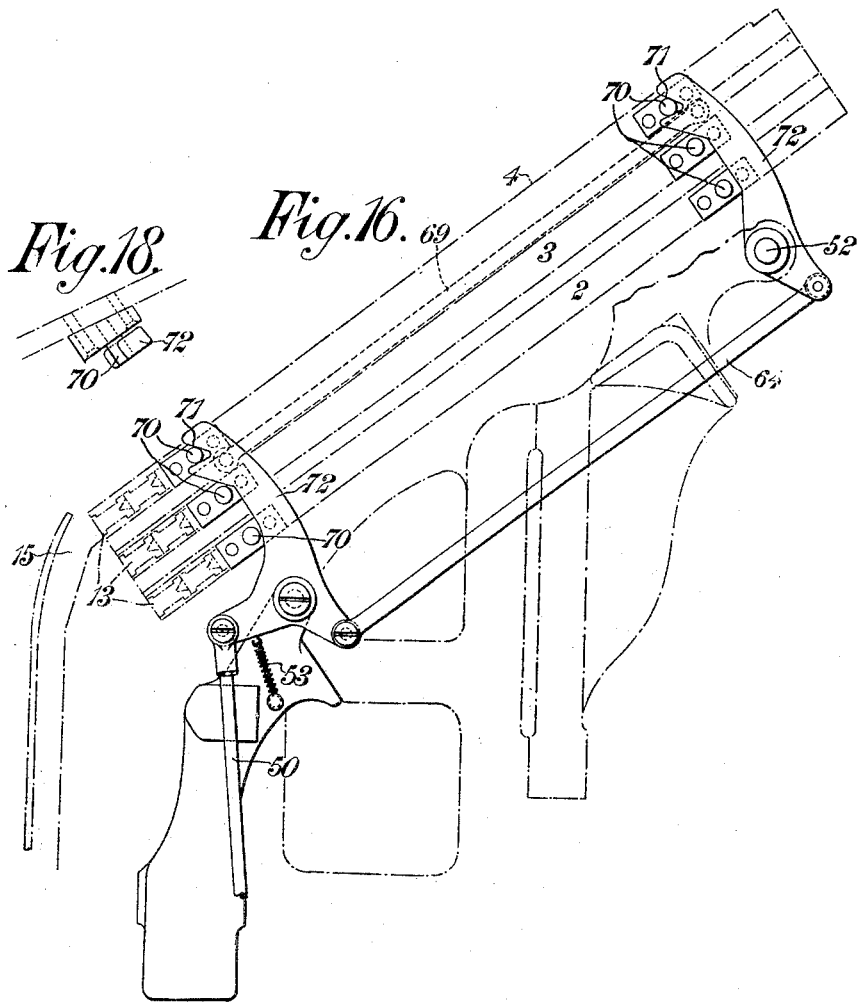

UNITED STATES PATENT OFFICE.

HERBERT PEARCE AND JOHN ERNEST BILLINGTON, OF BROADHEATH, ENGLAND, ASSIGNORS TO LINOTYPE AND MACHINERY LIMITED, OF LONDON, ENGLAND.

TYPOGRAPHICAL COMPOSING-MACHINE.

1,116,620.         Specification of Letters Patent.       Patented Nov. 10, 1914.

Application filed September 17, 1909. Serial No. 518,238.

*To all whom it may concern:*

Be it known that we, HERBERT PEARCE and JOHN ERNEST BILLINGTON, subjects of the King of the United Kingdom of Great Britain and Ireland, and residing at Linotype and Machinery Works, Broadheath, in the county of Chester, England, have invented new and useful Improvements in Typographical Composing - Machines, of which the following is a specification.

The present invention relates to improvements in typographical composing machines of the type described in the specification of application for Letters Patent S. N. 445631 filed July 27th 1908, and it will be best understood by reference to the accompanying drawings which are to be taken as part of this specification and read therewith.

In these drawings, Figure 1 is a side elevation of part of a typographical composing machine having improved quick change mechanism according to this invention; Fig. 1ᵃ is a view similar to Fig. 1 showing a modified arrangement of part of the mechanism; Fig. 2 is the left-hand part and Fig. 2ᵃ the right-hand part of a front elevation and Fig. 3 the left-hand part and Fig. 3ᵃ the right-hand part of a side elevation partly in vertical section, of part of the machine showing means for effecting the automatic pushing back of matrices accidentally projecting through the mouths of the magazines; Fig. 4 is a view generally similar to Fig. 3 but showing certain parts in different positions to those occupied by them in the said figure; Fig. 5 is a sectional detail view of a part of Fig. 3 or Fig. 4; Fig. 6 is a plan partly in section of one of the exactness of register insuring arms described in the above-mentioned specification with improved adjustable studs; Fig. 7 is a side elevation and Fig. 8 a front elevation of part of the machine showing an alternative arrangement of exactness of register insuring devices; Fig. 9 is a section taken about on the line 9—9 of Fig. 7; Fig. 10 is an elevation of a detached portion of the apparatus shown in Fig. 7; Fig. 11 is a side elevation and Fig. 12 a front elevation of part of the machine showing another alternative arrangement of exactness of register insuring devices; Fig. 13 is a plan of a detached portion of Fig. 11; Fig. 14 is a side elevation and Fig. 15, a front elevation of part of the machine showing a further alternative arrangement of exactness of register insuring devices; Figs. 16, 17 and 18 are views respectively similar to Figs. 11, 12 and 13 of still another alternative arrangement of exactness of register insuring devices, and Fig. 19 is a sectional view showing an improved matrix escapement mechanism according to the present invention.

Throughout the several figures of the drawings like reference numerals are used to indicate like or corresponding parts of the apparatus.

*Quick change mechanism.*—The improvements in this mechanism are illustrated in Fig. 1 and consist in the hand lever 1, by which the column of magazines 2, 3, 4 is raised and lowered, having its fulcrum or shaft 5 at a point rear of the point 6 at which the connecting rod 7 is connected to its operating arm 8, which latter is pivoted co-axially with the hand lever 1 and, like the latter, is fast to the shaft 5. In respects other than those just mentioned and as illustrated in Fig. 1, the lever and link devices by which the operative substitution of the magazines is effected, are practically identical with those described in the before-mentioned specification and that being so, owing to the changed position of the fulcrum of the hand lever 1, it will be seen that the direction in which the hand lever 1 is moved for raising and lowering the column of magazines 2, 3, 4, will be the reverse of the direction in which the magazines are removed in effecting a quick change; it will however be equally obvious that by interposing an additional lever in the train of connections connecting the rod 7 with the magazine frame 9, or by other means, as for example, those represented in Fig. 1ᵃ, the hand lever may be arranged to be moved in the same general direction in which the magazines are required to move in effecting quick changes.

In the arrangement shown in Fig. 1ᵃ, the upper end of the rod 7 is connected to the magazine frame 9 through a bell-crank lever 7ᵃ, of which, one arm is pivoted to the said rod, and the other arm is pivoted to a link or links 7ᵇ which, in turn, is or are pivoted to the magazine frame.

It is obvious that the column of magazines 2, 3, 4 cannot be moved up or down for a "quick change," if a single leading matrix is accidentally projecting through the mouth of the respective magazine; such an accidental projection is only likely to happen in respect of the magazine from which the operator is composing, and to provide for the automatic pushing back of such a projecting matrix is a feature of the present invention. As shown in Figs. 2, 2ª, 3, 4 and 5 of the accompanying drawings, this matrix pusher takes the form of a bar 10 pivoted at its ends in bearings 11 fast to the known brackets 12, and which bar is capable of being rocked forward, as shown in dotted lines in Figs. 3 and 5, out of the path of the leading matrices 13 as they pass through the magazine mouth 14 and enter the assembler entrance 15, and backward, up to the magazine mouth 14, as shown in dotted lines in Fig. 4 and in full lines in Fig. 5, so as to push back into the magazine, any matrices 13 which may have been projecting through the magazine mouth, this operation carrying the said matrices sufficiently far back into the magazine to enable the front escapement pawls 16 to engage with them in the ordinary well-known way, as shown in Figs. 3, 4 and 5. The pusher or bar 10 may be worked by hand but it is preferred that it should be automatic, and for this purpose it is connected to the exactness of register insuring arms 17 described farther on. One of the arms 17—it is the right-hand one in the example illustrated—is connected to the shaft 18 of the pusher 10, by a flexible band 19 of which one end is secured to a quadrant 20 fast to the shaft 18 and the other end is connected to a hook 21 fast to the respective arm 17, by which arrangement, as shown in Fig. 4, the rearward motion of the arm 17 will rock the pusher 10 into the full-line position of Fig. 5, and the forward motion of the said arm, as shown in Fig. 3, will allow the pusher 10 to return, or be returned to the dotted-line position of Figs. 3 and 5. This last-named returning motion of the pusher 10 may be effected by any suitable means such as a counterweight, although, as shown in Fig. 2ª, we prefer to employ a torsion spring 22 for the purpose, the said spring engaging at one end with the quadrant 20 and at the other end with the adjacent bearing 11. If desired, the quadrant 20 may be fitted on the left-hand end of the pusher shaft 18 and be operatively connected with the left-hand register insuring arm 17, or, instead of only a single operative connection at one end of the shaft 18 as previously described, there may be a connection of each of the two ends.

For facilitating the removal from the column, of the uppermost or any other of the magazines 2, 3, 4, and the substitution therefor of another one in its place, there are arms 23, 24 pivoted to the machine frame at respectively opposite sides of the column of magazines. When these arms are in their inoperative or rear position as shown with respect to the arm 23, in Fig. 4, studs 25 fast thereto, rest against suitable stationary stops 26. The outer ends of the arms 23, 24 are hooked as at 27, Figs. 3 and 4, and when the arms are in their operative position, as shown in Figs. 2, 2ª and 3, their upper edges project to the front beyond the assembler entrance 15, and form rails along which laterally projecting lugs 28 on the respective magazines, can ride as the latter are pulled to the front over the assembler entrance, and then be stopped by the hooks 27. The lugs 28 may be either on the ends of transverse bars 28ª fast to the bottom of the respective magazines—two of such bars are shown in dotted lines in Figs. 2 and 2ª—or on blocks 29 fast to the sides of the magazines, as shown for example in connection with the magazine 2 in Figs. 2, 2ª and 3ª.

*Balancing the column of magazines.*—The balancing agent described in the before mentioned specification is a spring, cam and chain so arranged that the spring is practically constant in spite of the varying degree of extension. Now a freely falling weight is the mechanical equivalent of a constant spring, and consequently the present invention is to be understood as including the combination with the column of magazines, of such a weight, suitably connected to the said column.

In Fig. 1 is illustrated an arrangement of the just mentioned freely falling weight; in this arrangement the weight 30 is attached to the lower end of a cord 31 whose upper end is attached to an arm 32 fast to a shaft 33 operatively connected with the magazine frame 9, by a pair of arms 34 and a pair of links 35. Between its ends the cord 31 is guided over a roller 36.

*Insuring exactness of register after a "quick change."*—The essence of the invention in this respect, consists in the coöperation of a plane of studs with a plane of tapered or inclined surfaces, and means for engaging one with the other to locate and lock any desired magazine in register with the assembler entrance, and for disengaging them from each other. In the example illustrated in Figs. 1, 2, 2ª and 3 the plane of inclined surfaces 37, four in number, as shown, is provided on the magazine frame 9, and the plane of studs 38 is carried by the several register insuring arms 17 which, as described in the before-mentioned specification, are all operatively connected together so as to enable them to be operated simultaneously. Each of the studs 38 has, preferably, an eccentric portion 39, Fig. 6, by which it is mounted in the respective arm 17, and is screw-threaded and provided with a nut 40, by which latter, conjointly with a shoulder 41ª on the stud, it may be rigidly secured in the said arm. By loosening the nut 40 and turning the stud 38 in the respective arm 17, the moment at which the said stud contacts with the respective inclined surface 37, after it has begun its register-insuring motion, may be adjusted exactly, the subsequent tightening of the nut 40 serving to retain the stud in the said adjusted position.

In the form illustrated in Figs. 7, 8, 9 and 10, the plane of inclined surfaces 41 is on the machine frame, and the studs 42 are indirectly on the magazine frame 9. In this arrangement the inclined surfaces 41 are preferably formed on castings 43 screwed to brackets 44 fast to the machine frame, and the studs 42 are on rocking arms 45, see particularly Fig. 10, pivoted by screws 45$^a$ to the magazine frame 9. There are four of the rocking arms 45, one at each corner of the magazine frame 9 (but only two are shown in the drawings), and they are all operatively connected together so that they shall all be operated simultaneously. Each of the arms 45 is formed with a slot or groove 46 with which engages studs or antifriction rollers 47 mounted on a bell-crank lever 48 and an arm 49 pivoted to the machine frame. The bell-crank lever 48 is connected by a rod or link 50 with a lever situated adjacent to the keyboard and adapted to be operated in the manner described hereinafter, and this bell-crank lever is connected, through a link 51 with the arm 49 at the respective side of the machine. The arm 49 is fast to a shaft 52 which extends transversely beneath the magazines and at its left-hand end it has fast to it an arm, similar to 49, which is in linked connection with a similar arm situated adjacent to the left-hand front corner of the magazines. A spring 53 acts on the bell-crank lever 48 and, through it, tends constantly to move the arms 45 forward into their register insuring position.

Referring to Figs. 1 and 1$^a$ the rod 50 which operates the bell crank lever 48 is connected at its lower end to a bell crank 80 pivoted on a fixed stud 81. The bell crank lever 80 has an upwardly extending arm which is provided with a pin 82 extending into a slot or opening in an arm 83 of a slide 84. The slide 84 has a forward and rearward movement being provided with a slot through which the fixed stud 81 passes and another slot through which a fixed stud 85 passes, as shown in Figs. 1 and 1$^a$. The slide 84 is normally drawn to the rear by a spring 86. On its forward side it is provided with an elongated flange 87 which is substantially concentric with the pivotal shaft 5 of the hand lever 1. The hand lever carries a small elbow lever 88 having a roller or pin 89 which engages the inner face of the flange 87. When it is desired to change from one magazine to another of the series the hand lever 1 and the elbow lever 88 are gripped, rocking the elbow lever 88 and drawing forward the slide 84. The slide 84, through pin 82, rocks the elbow lever 80 and raises the rod 50. The raising of this rod throws back the arm 17 and frees the magazine from the register insuring means. At the same time the blade or pusher 10 is rocked by means of its connection 19 with one of the arms 17 and any matrices which may have been protruding from the operative magazine are forced back into the magazine, thus leaving the tier of magazines free to be moved. While still gripping the lever 88 and the hand lever 1, the operator moves the latter lever until the desired magazine is brought into operative position. Then, on releasing the lever 88, the spring 86 will throw the slide 84 to the rear and draw the rod 50 downward, thus permitting the spring 17$^a$ to draw the register insuring arms into locking position and the spring 22 to throw the blade 10 rearward, out of the path of the matrices in the operative magazine. It will be noted that the control of the blade or pusher 10 is substantially automatic on account of its connection with the register insuring means.

In the form shown in Figs. 11, 12 and 13 there is provided a single plane of studs 54 each capable of sliding horizontally in a stationary arm or bracket 55 fast to the machine frame; only two of these studs 54 and arms or brackets 55 are shown in the drawings, viz:—those at the right-hand side of the machine, but it is to be understood that there is a similar set of these devices at the opposite or left-hand side of the machine. Each of the studs 54 is acted upon by a spring 56 (shown in dotted lines in Figs. 12 and 13) which constantly tends to move the said stud inward toward the respective magazine 2, 3 or 4, so that its inclined or wedge under surface 57 (Fig. 12) may engage with a correspondingly inclined surface 58 formed upon a bracket 59 rigidly secured to the side of the respective magazine. Each of the studs 54 has fast to it a laterally extending pin 60 held by the respective spring 56, in contact with a rocking cam 61 or 62 pivoted to fixed parts of the machine frame. The cam 61 is formed integral with an arm 63 pivoted to the upper end of a rod or link 50 adapted to be raised and lowered by a lever or device adjacent to the keyboard of the machine as has already been herein described with reference to the rod 50 shown in Figs. 7 and 8. The two cams 61, 62 shown in Figs. 11 and 12 are operatively connected together through a link 64, as are also the other two cams at the left-hand side of the machine (these two last-named cams however are not illustrated in the drawings) and the two sets of cams at the respectively opposite sides of the machine are operatively connected together by the shaft 52 to which both of the rearmost of the said cams 62 are rigidly secured. When, in the last described arrangement, the rod 50 is raised, all of the four cams 61, 62 are simultaneously rocked backward and, by acting on the pins 60, they simultaneously move all the studs 54 outward out of contact with the respective inclined surfaces 58 against the influence of the springs 56. This admits of the column of magazines being raised or lowered for effecting a "quick change" and when this change has been effected and the rod 50 is lowered, the four cams 61, 62, through the spring 53, are simultaneously rocked forward and the several springs 56 force the respective studs 54 into register-insuring contact with the respective inclined surfaces 58.

The form shown in Figs. 14 and 15 is somewhat similar to that last previously described inasmuch as each of the magazines 2, 3, 4 is provided with its own plane of inclined register-insuring surfaces 58 adapted to be engaged by a stud 54 slidable in an arm or bracket 55 fast to the machine frame. In this case, however, the inclination of the surfaces 58 is in a fore-and-aft direction, as shown best in Fig. 14, as distinguished from a lateral direction as in Figs. 11, 12 and 13, and the studs 54 are correspondingly arranged to move in a fore-and-aft, as distinguished from a lateral, direction. The forward or register-insuring movement of the studs 54 is effected by the springs 56, and their rearward or releasing movement is effected by rocking arms 65 engaging with pins 60 projecting laterally from the studs 54 through slots 66 in the arms or brackets 55, these pins and slots also serving to prevent the studs 54 from turning about their respective axes. The right-hand front arm 65 is preferably formed as an integral part of a three-armed lever, one arm being connected to an operating rod 50 and spring 53, as is the corresponding arm 63 in Fig. 11, and another arm 67 being connected by a link 64 with a corresponding arm 67ª of the rearmost arm 65 at the same side of the machine. The rear end of the link 64 is also pivoted to a crank arm 68 fast to a shaft 52 which transmits motion to the arms 65 at the left-hand side of the machine, the last-named arms being operatively connected together by a link 69 pivoted to their upper ends as shown in dotted lines in Fig. 14.

In the form shown in Figs. 16, 17 and 18, each magazine 2, 3, 4 has its own plane of studs 70, there being one such stud at, or near, each corner of each of the said magazines. The studs 70 are adapted to be engaged respectively by register-insuring jaws 71 provided on the upper ends of arms 72 pivoted to the machine frame and all connected together so that when the rod 50 is operated as before described in connection with the other examples, all of the jaws 71 will be simultaneously disengaged from, or engaged with, the respective plane of studs 70. The two arms 72 at the left-hand side of the machine are operatively connected together by a link 69 as indicated in dotted lines in Fig. 16, and the two sets of arms at the respectively opposite sides of the machine are operatively connected together by the shaft 52.

*Matrix escapement mechanism.*—The improvement in this mechanism, as shown in Fig. 19, consists in substituting a balance weight 73 for the spring which is usually employed for maintaining the front escapement pawl 16 in the path of the leading matrix. This weight 73 is rigidly attached to, or forms an integral part of, an arm 74 extending rearwardly from the escapement lever 75, and, normally occupies the position in which it is shown in full lines in Fig. 19. When the respective finger key is depressed the escapement lever 75 is turned on its pivot 76 against the influence of the weight 73 which, by this operation, is raised to the position in which it is shown broken away from the lever in dot-and-dash lines in Fig. 19; when the just mentioned finger key is released, the weight 73 descends to its normal position and in doing so returns the front escapement pawl 16 to its matrix-arresting position. The weighted lever is advantageous in that it avoids the need of using a spring and the dangers which attend the breakage or the setting of the spring, and also in that it secures a slight dwell of the pawls, and their comparatively slow return after the release of a matrix. This retardation of the movement is of advantage in this class of escapements in that it affords time for the second matrix to advance and assume the required relation to the pawls, after the preceding matrix is released.

The before described apparatus may be modified without departing from the spirit of the invention, for example, with particular reference to the exactness of register insuring devices, any combination of inclined surfaces and studs may be replaced by one of tapered sockets and tapered studs, and there may be one plane of studs for the column of magazines and one plane of inclined surfaces for each of such magazines.

We claim:—

1. In a typographical composing machine, the combination with a column of superposed magazines, and a magazine frame supporting the said column, adapted to be raised and lowered relatively to the fixed machine frame, of a hand lever adapted to effect the raising and lowering of the magazine frame, a shaft capable of turning about a fixed axis, the rear end of the hand lever being fast to this shaft, a lever arm also fast to this shaft and moving, as to direction, coincidentally with the hand lever, a bell-crank lever pivoted to the fixed machine frame, the two arms of the said bell-crank lever. when the latter is rocked, moving in the same direction, and links operatively connecting respectively the magazine frame with one arm of the bell-crank lever and the above-named lever arm with the other arm of the said bell-crank lever.

2. In a typographical composing machine, the combination with a column of superposed magazines, a magazine frame supporting the said column, adapted to be raised and lowered relatively to the fixed machine frame, a single entrance to the assembler, the raising and lowering of the magazine frame being adapted to bring the respective magazines into register with the assembler entrance, devices adapted to insure exactness of the just-named register, and a matrix pusher adapted to push matrices into a magazine registering with the assembler entrance, of devices operatively connecting the said pusher with the exactness of register insuring devices and adapted to operate the pusher simultaneously with the said devices.

3. In a typographical composing machine, the combination with a column of superposed magazines, a magazine frame supporting the said column, adapted to be raised and lowered relatively to the fixed machine frame, a single entrance to the assembler, the raising and lowering of the magazine frame being adapted to bring the respective magazines into register with the assembler entrance, devices adapted to insure exactness of the just-named register, and a matrix pusher adapted to push matrices into a magazine registering with the assembler entrance, of devices operatively connecting the said pusher with the exactness of register insuring devices said pusher being adapted to move into operative contact with the matrices and push the latter into the magazine when the exactness of register insuring devices are moved out of their exactness of register insuring position, and out of the path of the matrices leaving the magazine when the said devices are moved into their exactness of register insuring position.

4. In a typographical composing machine, the combination with a column of superposed magazines, a magazine frame supporting the said column, adapted to be raised and lowered relatively to the fixed machine frame, a single entrance to the assembler, the raising and lowering of the magazine frame being adapted to bring the respective magazines into register with the assembler entrance, devices adapted to insure exactness of the just-named register, and a bar in pivotal relationship to the assembler entrance, adapted to push matrices into a magazine registering with the assembler entrance, of means operative on the bar to normally hold it out of the path of the matrices leaving the magazine and to return it to its normal position, and devices operatively connecting the bar with the exactness of register insuring devices and adapted to move the bar into operative contact with the matrices and push them into the magazine when the exactness of register insuring devices are moved out of their exactness of register insuring position.

5. In a typographical composing machine, the combination with a column of superposed magazines, a magazine frame supporting the said column, adapted to be raised and lowered relatively to the fixed machine frame, a single entrance to the assembler, the raising and lowering of the magazine frame being adapted to bring the respective magazines into register with the assembler entrance, devices adapted to insure exactness of the just-named register, and a bar in pivotal relationship to the assembler entrance, adapted to push matrices into a magazine registering with the assembler entrance, of a spring operatively connected to the bar, adapted to normally hold it out of the path of the magazine and to return it to its normal position, and a flexible band operatively connecting the bar with the exactness of register insuring devices and adapted to move the said bar into operative contact with the matrices and push them into the magazine when the exactness of register insuring devices are moved out of their exactness of register insuring position.

6. In a typographical composing machine, the combination with a column of superposed magazines, a magazine frame supporting the said column, adapted to be raised and lowered relatively to the fixed machine frame, a single entrance to the assembler, the raising and lowering of the magazine frame being adapted to bring the respective magazines into register with the assembler entrance, devices adapted to insure exactness of the just-named register, and a bar in pivotal relationship to the assembler entrance, adapted to push matrices into a magazine registering with the assembler entrance, of a spring operatively connected to the bar, adapted to normally hold it out of the path of the magazine and to return it to its normal position, a sector operatively fast to the bar, and a flexible band the respectively opposite ends of which are attached one to the periphery of the sector, and the other to the exactness of register insuring devices, the whole adapted to move the bar into operative contact with the matrices and push them into the magazine when the exactness of register insuring devices are moved out of their exactness of register insuring position.

7. In a typographical composing machine, the combination with a column of superposed magazines, a magazine frame supporting the said column, adapted to be raised and lowered relatively to the fixed machine frame, and a single entrance to the assembler, the raising and lowering of the magazine frame being adapted to bring the respective magazines into register with the assembler entrance, of a plurality of pivoted arms, a plane of studs mounted on the arms, devices operatively connecting the arms with each other, a plane of inclined surfaces, means adapted to engage the studs with the inclined surfaces, manual means operative from the key-board, adapted to effect the disengagement of the studs from the inclined surfaces, eccentric portions on the studs, and means for securing the studs against rotation in the arms and for releasing them so as to allow them to be turned in the said arms, for adjusting the moment at which the studs contact with the inclined surfaces.

8. In a typographical composing machine, the combination with a column of superposed magazines, and a magazine frame supporting the said column, adapted to be raised and lowered relatively to the fixed machine frame, of a hand lever adapted to effect the raising and lowering of the magazine frame, the direction of motion of the said frame being coincident with that of the hand lever, a shaft capable of turning about a fixed axis, the rear end of the hand lever being fast to this shaft, a lever arm also fast to this shaft and moving, as to direction, coincidentally with the hand lever, devices operatively connecting the said lever arm with the magazine frame, a lever adapted to rock about a fixed horizontal axis, a link operatively connecting the lever with the magazine frame, and a freely falling weight operatively connected to the lever and adapted to balance the weight of the magazine frame plus that of the devices supported or carried by such frame.

9. In a typographical composing machine, the combination with a column of superposed magazines, and a magazine frame supporting the said column, adapted to be raised and lowered relatively to the fixed machine frame, of a hand lever adapted to effect the raising and lowering of the magazine frame, the direction of motion of the said frame being coincident with that of the hand lever, a shaft capable of turning about a fixed axis, the rear end of the hand lever being fast to this shaft, a lever arm also fast to this shaft and moving, as to direction, coincidentally with the hand lever, a bell-crank lever pivoted to the fixed machine frame, the two arms of the said bell-crank lever, when the latter is rocked, moving in the same direction, links operatively connecting respectively the magazine frame with one arm of the bell-crank lever and the above-named lever arm with the other arm of the said bell-crank lever, a lever adapted to rock about a fixed horizontal axis, a link operatively connecting the lever with the magazine frame, and a freely falling weight operatively connected to the lever and adapted to balance the weight of the magazine frame plus that of the devices supported or carried by such frame.

10. In a typographical composing machine, the combination with a column of superposed magazines and a magazine frame supporting the said column, adapted to be raised and lowered relatively to the fixed machine frame, of a plurality of arms pivoted to the magazine frame, a plane of studs mounted on the arms, devices operatively connecting the arms with each other, a plane of inclined surfaces operatively fast to the fixed machine frame, means adapted to automatically engage the studs with the inclined surfaces, and manual means operative from the key-board, adapted to effect the disengagement of the studs from the inclined surfaces.

11. In a typographical composing machine, the combination with a column of superposed magazines, and a magazine frame supporting the said column, adapted to be raised and lowered relatively to the fixed machine frame, of a plurality of arms pivoted to the magazine frame, a plurality of planes of studs mounted on the arms, one of such planes of studs corresponding with each of the magazines, devices operatively connecting the arms with each other, a plane of inclined surfaces operatively fast to the fixed machine frame, means adapted to automatically engage the studs with the inclined surfaces, and manual means operative from the key-board, adapted to effect the disengagement of the studs from the inclined surfaces.

12. In a typographical composing machine, the combination with a column of superposed magazines, and a magazine frame supporting the said column, adapted to be raised and lowered relatively to the fixed machine frame, of a plurality of arms pivoted to the magazine frame, a plurality of planes of studs mounted on the arms, slots in the arms, studs engaging the slots, devices operatively connecting these studs with each other, arms carrying the said studs, pivoted to the fixed machine frame, manual means operative from the key-board, adapted to operate the last mentioned studs and thereby also the first-named studs, and a plane of inclined surfaces operatively fast to the fixed machine frame and with which the said first-named studs are capable of being engaged.

13. In a typographical machine, the combination of the two escapement pawls and their actuating lever, said lever being weighted at one end to hold the pawls in normal position, and means for raising the weight to reverse the position of the pawls and release a matrix, said weight forming the sole means of returning the pawls to normal position, whereby the pawls are returned to normal position with a comparatively slow movement permitting the following matrix to assume a proper relation to its retaining pawl.

14. In a typographical composing machine, the combination with a column of superposed magazines, and a magazine frame supporting the said column, adapted to be raised and lowered relatively to the fixed machine frame, of a hand lever adapted to effect the raising and lowering of the magazine frame, the direction of motion of the said frame being coincident with that of the hand lever, a shaft capable of turning about a fixed axis, the rear end of the hand lever being fast to this shaft, a lever arm also fast to this shaft and moving, as to direction, coincidentally with the hand lever, a bell-crank lever pivoted to the fixed machine frame, the two arms of the said bell-crank lever, when the latter is rocked, moving in the same direction, links operatively connecting respectively the magazine frame with one arm of the bell-crank lever and the above-named lever arm with the other arm of the said bell-crank lever, a lever pivoted at a point intermediate its two ends and adapted to rock about a fixed horizontal axis, a link operatively connecting one end of the last-named lever with the magazine frame, and a freely falling weight operatively connected to the other end of the lever.

15. In a typographical composing machine, the combination with a column of superposed magazines, and a magazine frame supporting the said column, adapted to be raised and lowered relatively to the fixed machine frame, of a hand lever adapted to effect the raising and lowering of the magazine frame, the direction of motion of the said frame being coincident with that of the hand lever, a shaft capable of turning about a fixed axis, the rear end of the hand lever being fast to this shaft, a lever arm also fast to this shaft and moving, as to direction, coincidentally with the hand lever, a bell-crank lever pivoted to the fixed machine frame, the two arms of the said bell-crank lever, when the latter is rocked, moving in the same direction, links operatively connecting respectively the magazine frame with one arm of the bell-crank lever and the above-named lever arm with the other arm of the said bell-crank lever, a lever pivoted at a point intermediate its two ends and adapted to rock about a fixed horizontal axis, a link operatively connecting one end of the last-named lever with the magazine frame, a freely falling weight operatively connected to the other end of the lever, a single entrance to the assembler, the raising and lowering of the magazine frame being adapted to bring the respective magazines into register with the assembler entrance, and devices adapted to insure exactness of the just-named register.

16. In a typographic machine, a main frame and a column of magazines mounted to rise and fall therein, a movable member mounted in the frame and arranged to push protruding matrices into the magazine which is in operative position, and means for locking a magazine in operative position and for unlocking the same, the movable pushing member being connected to said locking and unlocking means whereby it is automatically operated.

17. In a typographic machine, the combination with a main frame and a column of magazines arranged to rise and fall therein, of hand operated means for locking any desired magazine in operative position, means for unlocking the magazine preparatory to moving the same to another position, a pusher for moving protruding matrices into the magazines, and a connection between the pusher and the locking and unlocking means, whereby the pusher is automatically operated when said means are operated.

In witness whereof we have hereunto set our hands in the presence of two witnesses.

HERBERT PEARCE.
JOHN ERNEST BILLINGTON.

Witnesses:
ARTHUR HORACE SMITH,
ROBERT BRIGGS.